(12) United States Patent
Hao et al.

(10) Patent No.: US 12,051,985 B2
(45) Date of Patent: *Jul. 30, 2024

(54) BATTERY CHARGING SYSTEMS AND METHODS VIA ELECTRIC MACHINE

(71) Applicant: GM GLOBAL TECHNOLOGY OPERATIONS LLC, Detroit, MI (US)

(72) Inventors: Lei Hao, Troy, MI (US); Suresh Gopalakrishnan, Troy, MI (US); Chandra S. Namuduri, Troy, MI (US); Dongxu Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/694,865

(22) Filed: Mar. 15, 2022

(65) Prior Publication Data

US 2023/0299702 A1    Sep. 21, 2023

(51) Int. Cl.
| | |
|---|---|
| *H02P 25/18* | (2006.01) |
| *B60L 50/50* | (2019.01) |
| *B60L 53/16* | (2019.01) |
| *H02J 7/02* | (2016.01) |
| *H02K 3/28* | (2006.01) |
| *H02M 7/797* | (2006.01) |
| *H02P 27/08* | (2006.01) |

(52) U.S. Cl.
CPC .............. *H02P 25/18* (2013.01); *B60L 50/50* (2019.02); *B60L 53/16* (2019.02); *H02J 7/02* (2013.01); *H02K 3/28* (2013.01); *H02M 7/797* (2013.01); *H02P 27/08* (2013.01); *B60L 2210/44* (2013.01)

(58) Field of Classification Search
CPC . H02K 3/28; H02P 27/08; H02P 25/18; H02J 7/02; B60L 50/50; B60L 53/16; B60L 2210/44; H02M 7/797; H02M 7/5387
See application file for complete search history.

(56) References Cited

U.S. PATENT DOCUMENTS

| | | | |
|---|---|---|---|
| 8,736,216 B2 | 5/2014 | Naik et al. | |
| 9,621,099 B1 | 4/2017 | Namuduri et al. | |
| 9,882,521 B2 | 1/2018 | Namuduri et al. | |
| 10,917,030 B1 | 2/2021 | Hao et al. | |
| 10,998,840 B2 * | 5/2021 | Hao | H02P 27/08 |
| 2012/0068656 A1 * | 3/2012 | Fulton | H02K 9/19 |
| | | | 318/497 |
| 2022/0368270 A1 * | 11/2022 | Huang | B60L 58/27 |

* cited by examiner

*Primary Examiner* — Said Bouziane

(57) ABSTRACT

An electric machine includes: a first stator winding including first and second stator winding portions; a second stator winding including third and fourth stator winding portions; a third stator winding including fifth and sixth stator winding portions, where inputs of the stator windings are configured to be connected to phases, respectively, of an inverter; and switches connected between the stator winding portions and outputs of a power source.

20 Claims, 11 Drawing Sheets

BATTERY CHARGING SYSTEMS AND METHODS VIA ELECTRIC MACHINE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to motor control systems and methods and more particularly to systems and methods for controlling switches of inverters and electric machines of vehicles for battery charging.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a system includes: an inverter module including first, second, and third phases; a battery that has a first voltage and that is electrically connected in series with the inverter module; an electric machine including: a first stator winding including first and second stator winding portions, the first phase electrically connected to a first end of the first stator winding portion; a second stator winding including third and fourth stator winding portions, the second phase electrically connected to a first end of the third stator winding portion; a third stator winding including fifth and sixth stator winding portions, the third phase electrically connected to a first end of the fifth stator winding portion; a first switch electrically connected between (a) a second end of the first stator winding portion and (b) a first node that is electrically connected to a first end of the second stator winding portion; a second switch electrically connected between (a) a second end of the third stator winding portion and (b) a second node that is electrically connected to a first end of the fourth stator winding portion; and a third switch electrically connected between (a) a second end of the fifth stator winding portion and (b) a third node that is electrically connected to a first end of the sixth stator winding portion; a charge port electrically connected to the first, second, and third nodes and configured to be connected to an alternating current (AC) power source having a second that is less than the first voltage; and a motor control module configured to selectively actuate switches of the inverter module, open the first, second, and third switches of the electric machine, and selectively actuate other switches of the electric machine and thereby charge the battery with power from the AC power source using the first, second, and third stator windings of the electric machine.

In further features, the first, third, and fifth stator winding portions are galvanically isolated from the second, fourth, and sixth stator winding portions, respectively, when the first, second, and third switches of the electric machine are open.

In further features, the first voltage is greater than 400 volts direct current (DC).

In further features, the electric machine further includes: a fourth switch electrically connected between second ends of the first stator winding portion and the third stator winding portion; a fifth switch electrically connected between the second end of the third stator winding portion and a second end of the fifth stator winding portion; a sixth switch electrically connected between second ends of the fourth and sixth stator winding portions; and a seventh switch electrically connected between the second end of the fourth stator winding portion and a second end of the sixth stator winding portion.

In further features, the motor control module is configured to, when a speed of the electric machine is greater than zero and less than a predetermined speed: selectively close the first, second, and third switches; maintain the fourth and fifth switches open; and selectively close the fifth and sixth switches.

In further features, the motor control module is further configured to, when the speed of the electric machine is greater than the predetermined speed: selectively open the first, second, and third switches; and selectively close the fourth and fifth switches.

In further features, the electric machine further includes: a seventh switch electrically connected between the first end of the second stator winding portion and the first end of the fourth stator winding portion; and an eighth switch electrically connected between the first end of the fourth stator winding portion and the first end of the sixth stator winding portion.

In further features, the fourth, fifth, sixth, and seventh switches each include a bidirectional switch.

In further features: the AC power source is a single phase AC power source; and the motor control module is configured to selectively open either: the fourth and sixth switches; and the fifth and seventh switches.

In further features, the first, second, and third switches each include one of a relay and a solid state switch.

In further features, the AC power source is a three phase AC power source.

In a feature, an electric machine includes: a first stator winding including first and second stator winding portions, a first end of the first stator winding portion configured to be electrically connected to a first phase of an inverter module; a second stator winding including third and fourth stator winding portions, a first end of the third stator winding portion configured to be electrically connected to a second phase of the inverter module; a third stator winding including fifth and sixth stator winding portions, a first end of the fifth stator winding portion configured to be electrically connected to a third phase of the inverter module; a first switch electrically connected between (a) a second end of the first stator winding portion and (b) a first node that is electrically connected to a first end of the second stator winding portion, the first node configured to be connected to a first output of a power source; a second switch electrically connected between (a) a second end of the third stator winding portion and (b) a second node that is electrically connected to a first end of the fourth stator winding portion, the second node configured to be connected to a second output of the power source; and a third switch electrically connected between (a) a second end of the fifth stator winding portion and (b) a third node that is electrically connected to a first end of the sixth stator winding portion, the third node configured to be connected to a third output of the power source.

In a feature, a system includes: a first inverter module including first, second, and third phases; a battery that is electrically connected in series with the first inverter module; an electric machine including: a first stator winding including first and second stator winding portions, the first phase electrically connected to a first end of the first stator winding portion; a second stator winding including third and fourth stator winding portions, the second phase electrically connected to a first end of the third stator winding portion; a third stator winding including fifth and sixth stator winding portions, the third phase electrically connected to a first end of the fifth stator winding portion; a first switch electrically connected between (a) a second end of the first stator winding portion and (b) a first node that is electrically connected to a first end of the second stator winding portion; a second switch electrically connected between (a) a second end of the third stator winding portion and (b) a second node that is electrically connected to a first end of the fourth stator winding portion; and a third switch electrically connected between (a) a second end of the fifth stator winding portion and (b) a third node that is electrically connected to a first end of the sixth stator winding portion; a charge port electrically connected to the first, second, and third nodes and configured to be connected to first, second, and third phases of a second inverter module that receives a direct current (DC) output from a DC power source; and a motor control module configured to selectively actuate switches of the first inverter module, open the first, second, and third switches of the electric machine, and selectively actuate other switches of the electric machine and thereby charge the battery with power from the DC power source using the first, second, and third stator windings of the electric machine.

In further features: the battery has a first voltage; and the DC power source has a second voltage that is less than the first voltage.

In further features: a fourth switch configured to be connected to a first reference potential of the DC power source and connected to a first reference potential of the battery; and a fourth switch configured to be connected to a second reference potential of the DC power source and to a second reference potential of the battery.

In further features: the battery has a first voltage; and the DC power source has a second voltage that is greater than or equal to the first voltage.

In further features, the first, third, and fifth stator winding portions are galvanically isolated from the second, fourth, and sixth stator winding portions, respectively, when the first, second, and third switches of the electric machine are open.

In further features, a first voltage of the battery is greater than 400 volts direct current (DC).

In further features, the electric machine further includes: a fourth switch electrically connected between second ends of the first stator winding portion and the third stator winding portion; a fifth switch electrically connected between the second end of the third stator winding portion and a second end of the fifth stator winding portion; a sixth switch electrically connected between second ends of the fourth and sixth stator winding portions; and a seventh switch electrically connected between the second end of the fourth stator winding portion and a second end of the sixth stator winding portion.

In further features, the fourth, fifth, sixth, and seventh switches each include a bidirectional switch.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a battery having a first voltage rating, such as 800 volts (V) direct current (DC) or another suitable voltage rating. Some chargers may be configured to directly charge the battery. Other chargers may include a second voltage rating that is less than the first voltage rating and therefore be unable to, by itself, charge the battery.

The vehicle may include a DC to DC converter configured to boost the output of a charger having the second voltage rating. DC to DC converters, however, are costly, add weight to the vehicle, and take up space of the vehicle.

The present application involves using stator windings of an electric motor (electric machine) of a vehicle to boost the output voltage of the charger having the second voltage to charge the battery. The stator windings each include two or more individual stator winding portions that are connected in series. The electric motor also includes switches configured to allow the stator winding portions to be used individually to drive a rotor of the electric motor (e.g., for high speed operation of the electric motor) and together in series to drive the rotor (e.g., for low speed operation of the electric motor). The electric motor may include switches disposed between stator winding portions to galvanically isolate pairs of the stator winding portions. When these switches are open, pairs of the stator winding portions act as primary and secondary windings of transformers to provide galvanic isolation.

Figure 1:
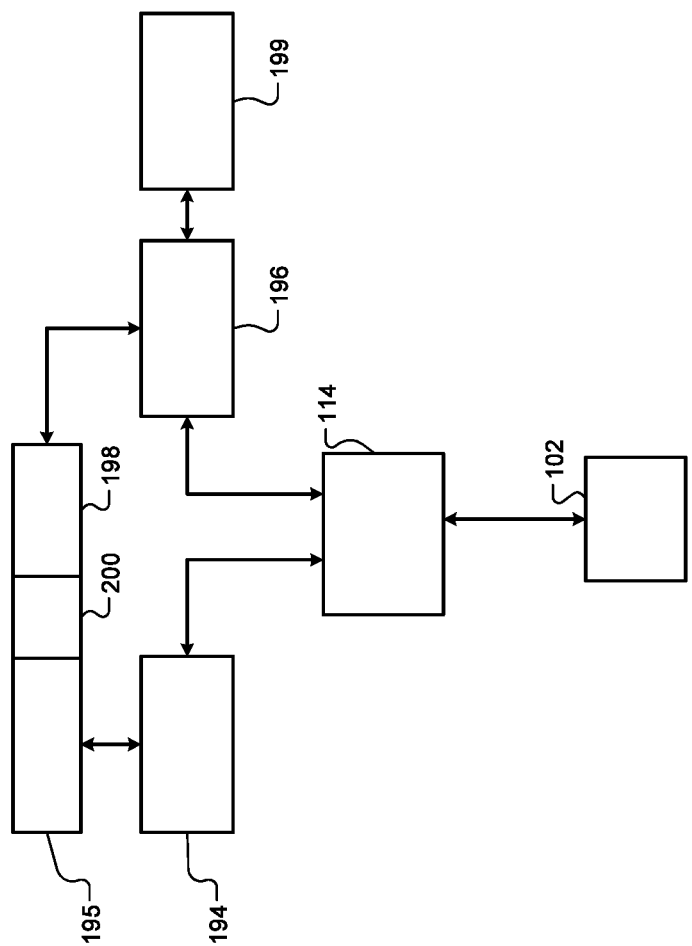
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, semi-autonomous vehicles, non-autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor (electric machine) can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198.

Figure 2:
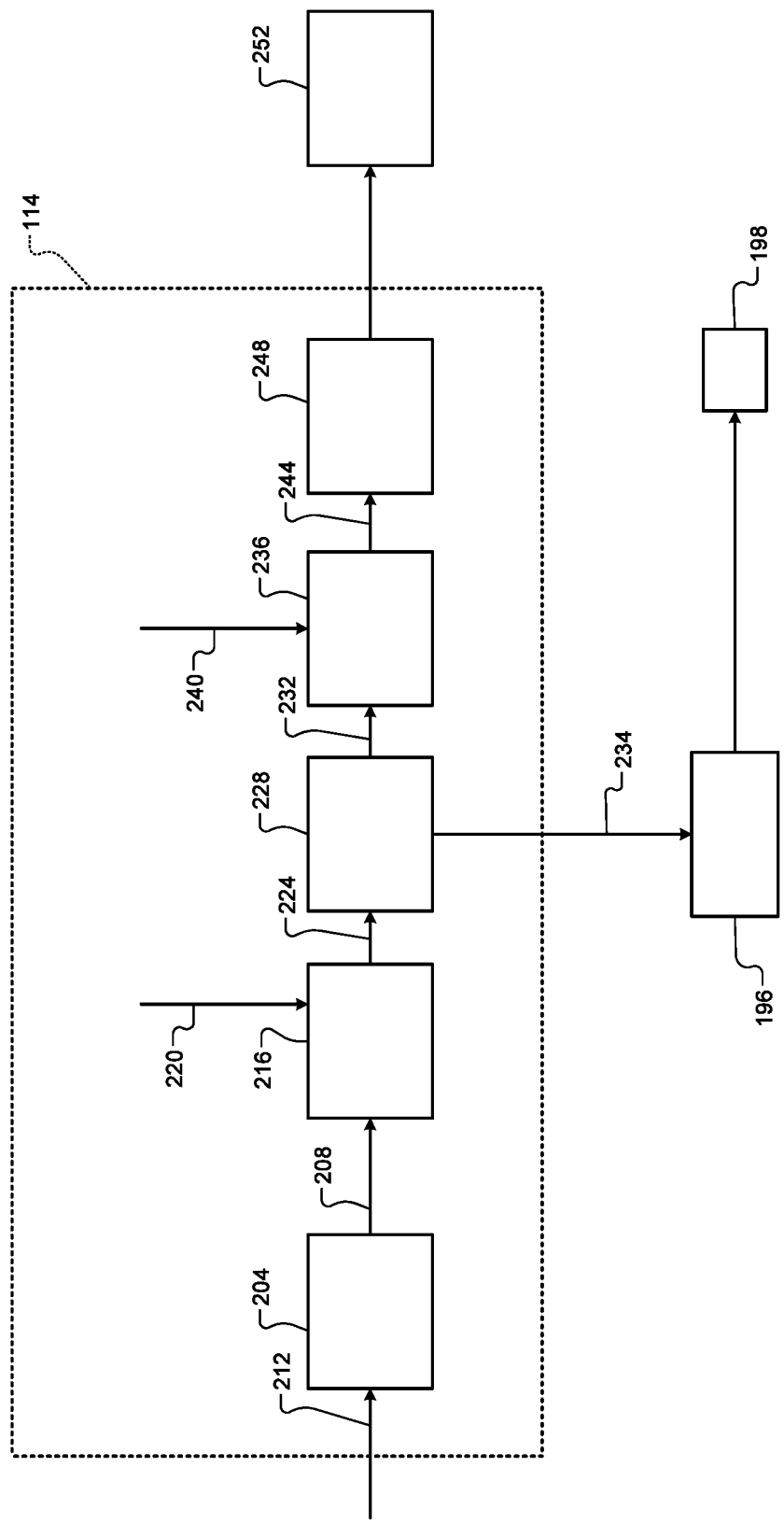
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 may determine the driver torque request 208 using one or more lookup tables or equations that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request.

In the example of an electric vehicle, the ECM 114 may be omitted, and the driver torque module 204 and the axle torque arbitration module 216 may be implemented within the motor control module 196. In electric vehicles, the driver torque module 204 may input the driver torque request 208 to the motor control module 196, and the components related to controlling engine actuators may be omitted.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls engine actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module 316 based on the motor torque request 234, as discussed further below. The inverter module converts direct current (DC) power into alternating current (AC) power. The inverter module applies AC power to the motor 198. Switching of the inverter module controls torque of the electric motor 198. The inverter module also converts power generated by the electric motor 198 into DC power and outputs DC power for the battery 199, for example, to charge the battery 199.

The inverter module includes a plurality of switches, such as three legs of switches. The motor control module switches the switches to apply alternating current (AC) power to the electric motor 198 to drive the electric motor 198. For example, the inverter module may generate n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198. The output shaft of the electric motor 198 is connected to one or more wheels of the vehicle. As discussed further below, the stator windings may also be used to boost a voltage from a charging station to a higher voltage of the battery 199.

In various implementations, one or more filters (e.g. capacitors) may be implemented. The one or more filters may be implemented, for example, to filter power flow between the inverter module and the battery 199.

Figure 3:
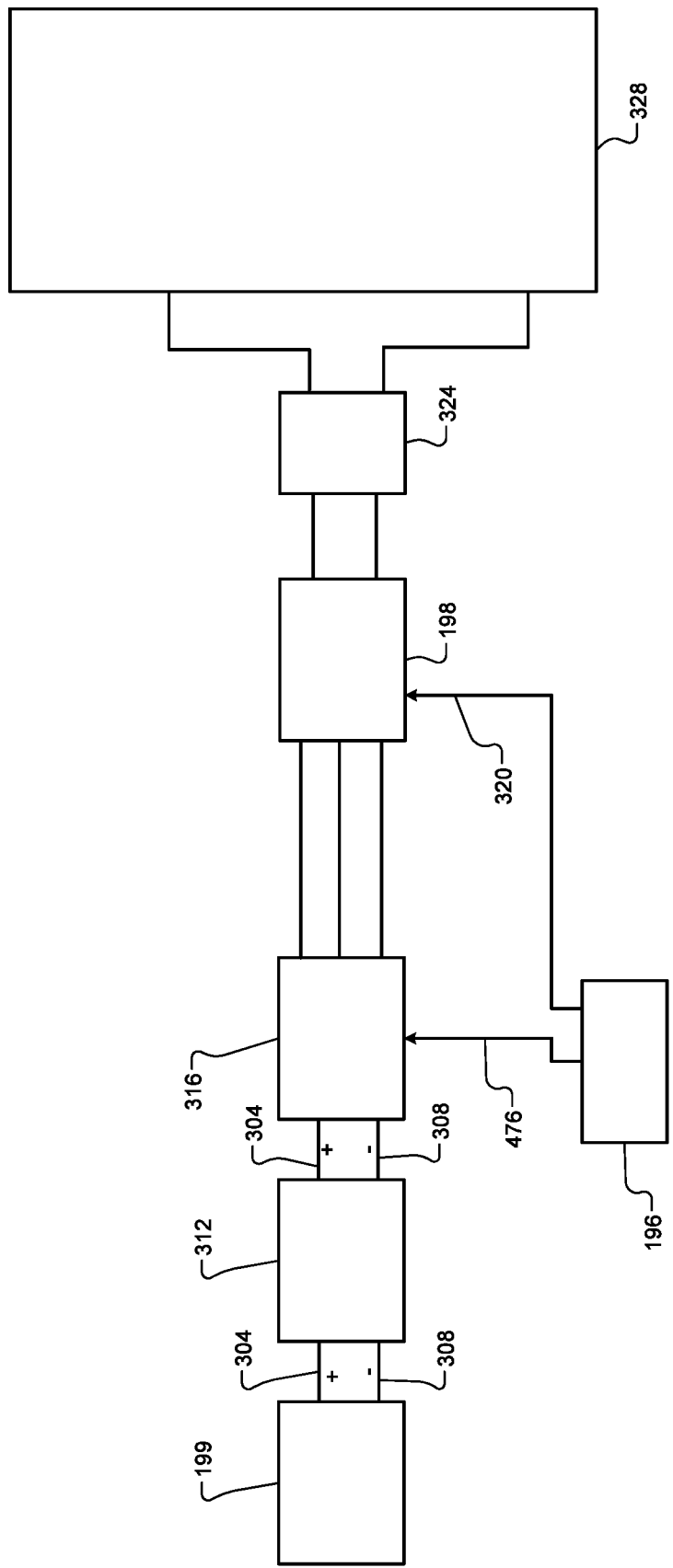
FIG. 3 includes a schematic including an example implementation of a power control system.

FIG. 3 includes a schematic including an example implementation of a power control system. The battery 199 may also be referred to or include a battery pack, as discussed above. The battery 199 may have a voltage of 800 V DC or another suitable voltage rating.

High (positive, DC+) and low (negative, DC−) sides 304 and 308 are connected to positive and negative terminals, respectively, of the battery 199. One or more capacitors, such as capacitor 312, are connected in parallel with the battery 199 between the high and low sides 304 and 308. The capacitor(s) 312 stabilize the DC bus and provide a low impedance voltage source to the inverter module since the battery 199 may have a higher impedance.

The inverter module 316 includes three legs, one leg connected to each phase of the electric motor 198. The inverter module 316 controls current flow to the legs/phases of the electric motor 198. The inverter module 316 converts DC power from the high and low sides 304 and 308 into 3-phase AC power and outputs the AC power to the electric motor 198.

Figure 4:
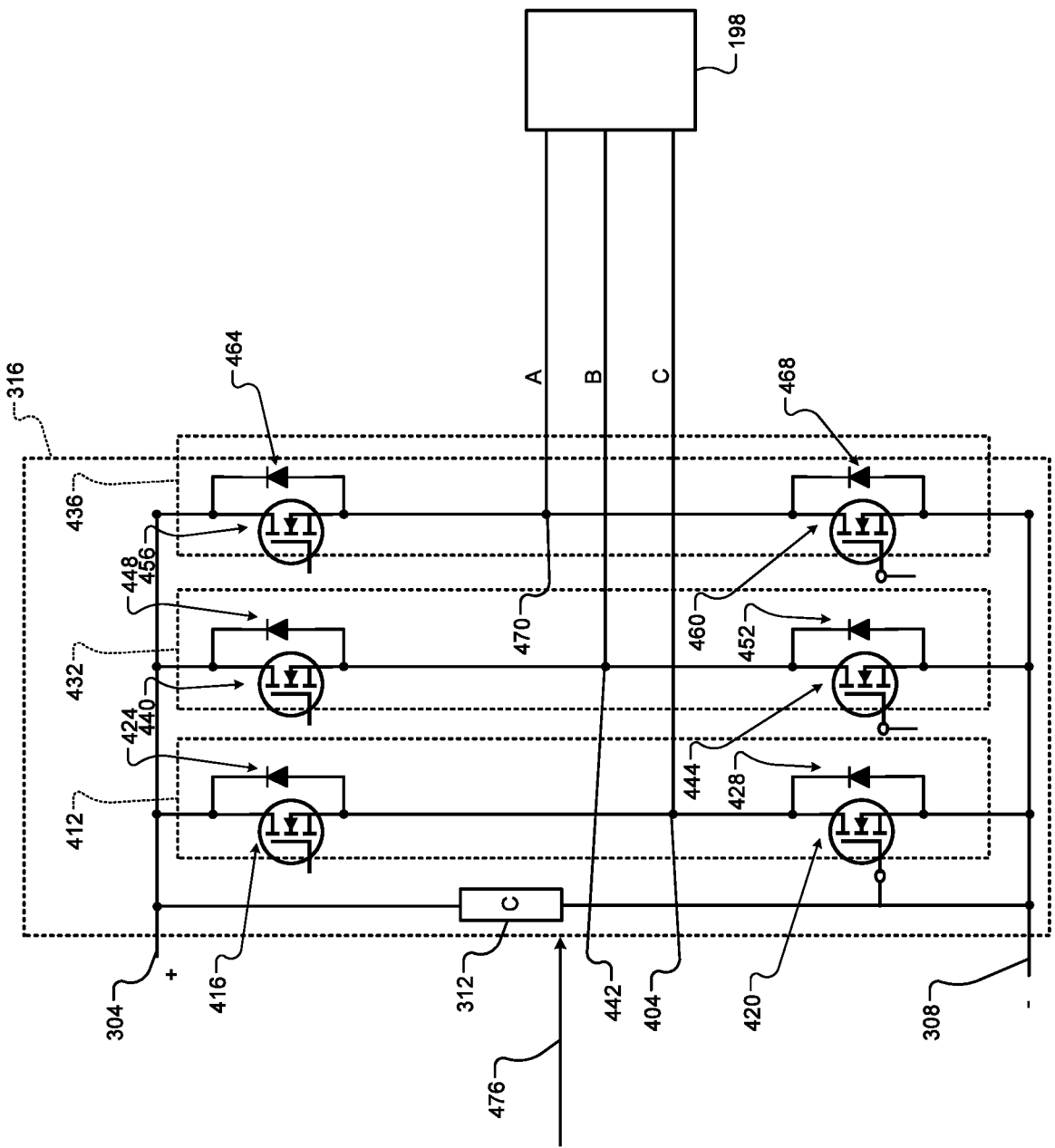
FIG. 4 includes a schematic of example implementations of an inverter module.

FIG. 4 includes a schematic of an example implementation of the inverter module 316. The inverter module 316 includes three legs. One leg is connected to each phase of the electric motor 198.

A first leg 412 includes first and second switches 416 and 420. The switches 416 and 420 each include a first terminal, a second terminal, and a control terminal. Each of the switches 416 and 420 may be an insulated gate bipolar transistor (IGBT), a field effect transistor (FET), such as a metal oxide semiconductor FET (MOSFET), silicon carbide MOSFET, or another suitable type of switch. In the example of IGBTs and FETs, the control terminal is referred to as a gate.

The first terminal of the first switch 416 is connected to the high side 304. The second terminal of the first switch 416 is connected to a node 404. The second terminal of the second switch 420 may be connected to the low side 308. The node 404 is connected to the second terminal of the first switch 416, the first terminal of the second switch 420, and a first phase (e.g., a) of the electric motor 198.

The first leg 412 may include first and second diodes 424 and 428 connected anti-parallel to the switches 416 and 420, respectively. In other words, an anode of the first diode 424 may be connected to the second terminal of the first switch 416, and a cathode of the first diode 424 may be connected to the first terminal of the first switch 416. An anode of the second diode 428 may be connected to the second terminal of the second switch 420, and a cathode of the second diode 428 may be connected to the first terminal of the second switch 420. The diodes 424 and 428 form one phase of a three-phase rectifier for converting power from the electric motor 198 into power for the battery 199. However, the diodes 424 and 428 may be omitted, such as if switches 416, 440, 456, 420, 444, and 460 are MOSFETS (with a built in diode). The diodes 424 and 428 may be included if included with a power module of an IGBT.

The inverter module 316 also includes second and third legs 432 and 436. The second and third legs 432 and 436 may be (circuitry wise) similar or identical to the first leg 412. In other words, the second and third legs 432 and 436 may each include respective switches and diodes like the switches 416 and 420 and the diodes 424 and 428, connected in the same manner as the first leg 412. For example, the second leg 432 includes switches 440 and 444 and anti-parallel diodes 448 and 452. A node 442 is connected to the first terminal of the switch 444, and a second stator winding (e.g., b) of the electric motor 198. The third leg 436 includes switches 456 and 460, and anti-parallel diodes 464 and 468. A node 470 is connected to the first terminal of the switch 460 and a third stator winding (e.g., c) of the electric motor 198. Like the diodes 424 and 428, the diodes 448, 452, 464, and 468 may be omitted.

Control terminals of the switches of the inverter module 316 are connected to switch signals 476 from the motor control module 196. The motor control module 196 generates the switch signals 476 such that the high side switch of a leg is on while the low side switch of that leg is off and vice versa. The motor control module 196 generates the switch signals 476 using pulse width modulation (PWM) control.

The switch signals of the gates of the low side switches 420, 444, and 460 may be inverted such that the switch signals applied to the low side switches 420, 444, and 460 are opposite in polarity to the control signals applied to the gates of the high side switches 416, 440, and 456.

Figure 5:
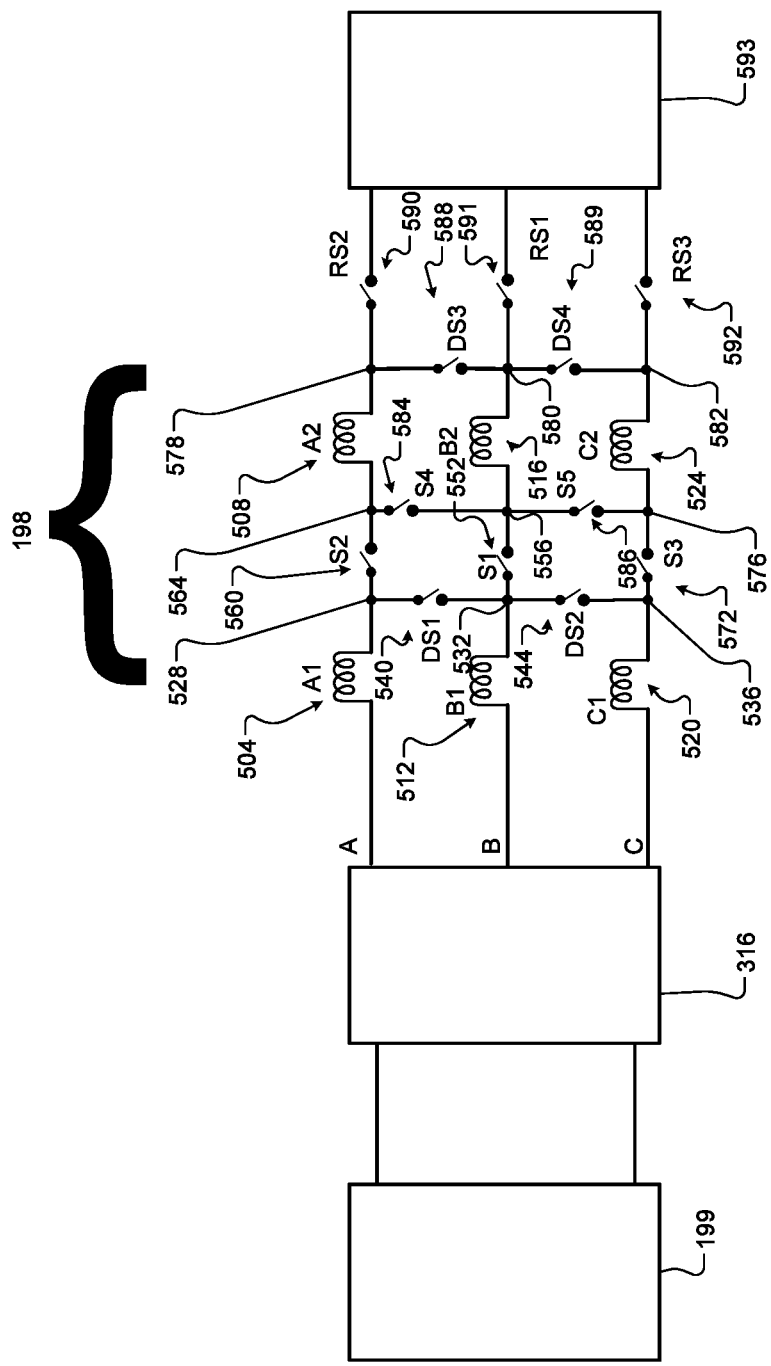
FIGS. 5-8 include schematics of example motor systems.

FIG. 5 includes a schematic of an example implementation of the motor 198. The stator windings of the motor 198 are each divided into two or more inductive stator winding sections/portions. For example, a first phase (A) of the motor 198 includes first and second stator windings (A1 and A2) 504 and 508. A second phase (B) of the motor 198 includes third and fourth stator windings (B1 and B2) 512 and 516. A third phase (C) of the motor 198 includes fifth and sixth stator windings (C1 and C2) 520 and 524.

First ends of the first, third, and fifth stator windings 504, 512, and 520 are connected to the nodes 470, 442, and 404, respectively, of the inverter module 316. Second ends of the first, third, and fifth stator windings 504, 512, and 520 are connected to nodes 528, 532, and 536, respectively. A first switch (DS1) 540 is connected between the node 528 and the node 532. A second switch (DS2) 544 is connected between the node 532 and the node 536. The first and second switches 540 and 544 may be bidirectional switches, such as illustrated.

A third switch 552 (S1) is connected between the node 532 and node 556. A fourth switch 560 (S2) is connected between the node 528 and node 564. A fifth switch 568 (S3) is connected between the node 572 and node 576.

First ends of the second, fourth, and sixth stator windings 508, 516, and 524 are connected to the nodes 564, 556, and 576, respectively. Second ends of the second, fourth, and sixth stator windings 508, 516, and 524 are connected to nodes 578, 580, and 582, respectively. A sixth switch 584 (S4) is connected between the node 564 and the node 556. A seventh switch 586 (S5) is connected between the node 556 and the node 576.

An eighth switch (DS3) 588 is connected between the node 578 and the node 580. A ninth switch (DS4) 589 is connected between the node 580 and the node 582. The eighth and ninth switches 588 and 589 may be bidirectional switches, such as illustrated. The third, fourth, fifth, sixth, and seventh switches 552, 560, 572, 584, and 586 may be relays, solid state switches, or another suitable type of switch.

Figure 7:
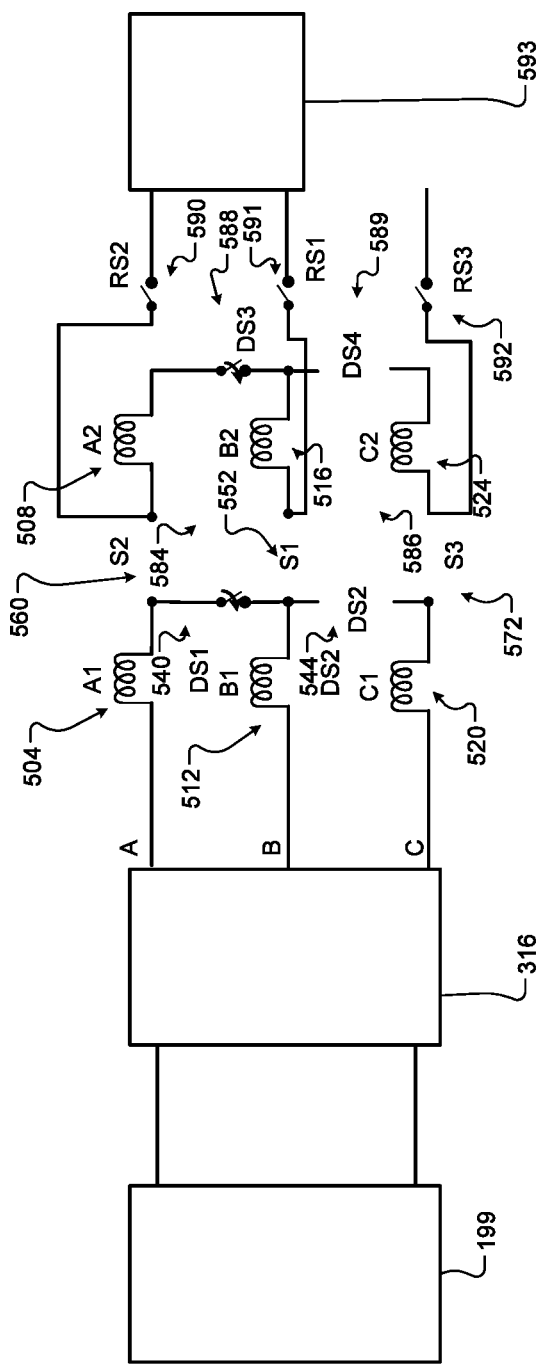

A tenth switch 590 (RS2) is connected between the node 578 and a first reference of an AC power source 593, such as a three phase AC (alternating current) power source. An example of a single phase AC power source is shown in the example of FIG. 7. An eleventh switch 591 (RS1) is connected between the node 580 and a second reference of the AC power source 593. A twelfth switch 592 (RS3) is connected between the node 582 and a third reference of the AC power source 593. The AC power source 593 has a lower voltage rating than the battery 199. The stator windings are used to boost the output voltage of the AC power source 593 to charge the battery 199.

While the example of each phase being divided into 2 stator windings (e.g., first phase includes 504 and 508), the motor 198 may include N stator windings connected in series per phase where N is an integer greater than or equal to 2. For additional stator windings per phase, additional switches like the eighth and ninth switches 588 and 589 would also be included and connected in the same way between two phases.

The motor control module 196 controls switching of the switches of the motor 198 (e.g., 560, 584, 540 588, 590, 591, 552, 544, 586, 572, 589, 592) via motor switch signals 320.

For example, when a speed (e.g., target speed or present speed) of the motor 198 is greater than a predetermined speed, the motor control module 196 may use only a portion of each of the stator windings (e.g., only the first, third, and fifth stator windings 504, 512, and 520). To do this, the motor control module 196 controls switching of the inverter module 316, selectively closes the switches 560, 552, and 572 (S1, S2, S3), and selectively closes the (left ones of the) switches 588 and 589 (and opens the right ones of the switches 588 and 589). When the speed (e.g., target speed or present speed) of the motor 198 is less than the predetermined speed, the motor control module 196 may use all portions of the stator windings (504, 508, 512, 516, 520 and 524). To do this, the motor control module 196 controls switching of the inverter module 316, selectively opens switches 552, 572, and 560, and selectively closes the (left ones of the) switches 540 and 544 (and opens the right ones of the switches 540 and 544). In this manner, the stator windings are reconfigurable to perform a function similar to that of a gear change in a transmission. Using the stator windings to boost the voltage of the AC power source 593 may provide fast charging and allow for galvanic isolation from the AC power source 593.

Each of the stator windings 504, 508, 512, 516, 520, and 524 may have the same or different inductance and the same or different number of turns. The inductance may be, for example, between 1/10 millihenry (mH) and 100 mH or another suitable inductance. The inductance and the number of turns may be selected to minimize a torque output during charging of the battery 199 and minimizes a loss of the motor 198. The inductance and the number of turns may also be selected to create preferred electronics gear ratio. For example, if the number of turns of 504, 412 and 520 are 2 times of number of turns of 508, 516 and 524. The electric machine can operate in full winding and ⅔ winding instead of full winding and half winding if number of turns are same. The inductance and the number of turns may be also selected to benefit more on preferred operation such as AC charging function. Different number of turns will allow machine to behave as different turn ratio transformer to accommodate voltage level difference between vehicle and external source.

Figure 11:
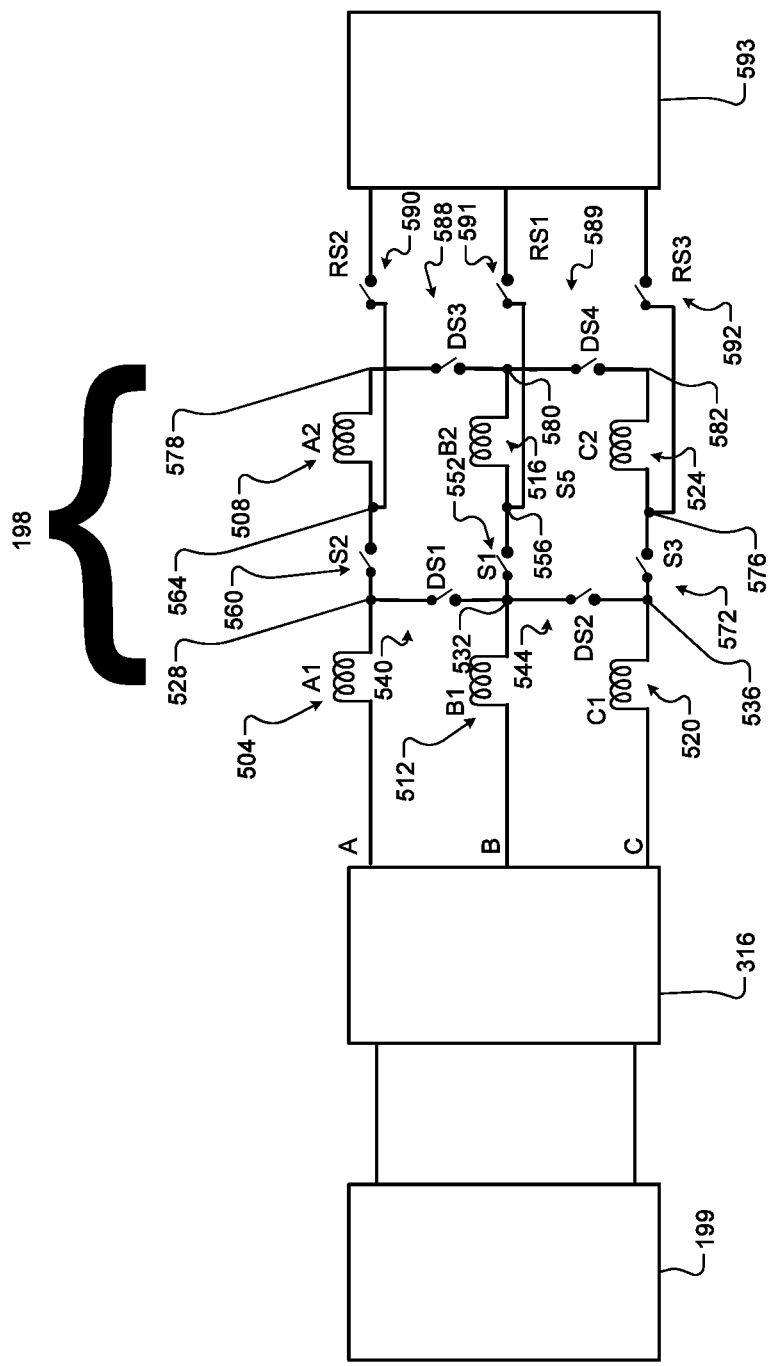
FIG. 11 includes a schematics of an example motor system.

In various implementations, the switches 584 and 586 may be omitted. This may reduce cost relative to the example shown in FIG. 5, such as shown in the example of FIG. 11.

The motor control module 196 maintains the switches 590, 591, and 592 open when charging of the battery 199 is not occurring. The motor control module 196 selectively closes the switches 590, 591, and 592 for charging of the battery 199. Via the stator windings, the battery 199 can be charged more quickly, such as at greater than 50 kilowatts per hour and greater than 180 miles of range per hour via the AC power source 593. Also a DC power source may not be needed. DC power sources are more costly than AC power sources.

Figure 6:
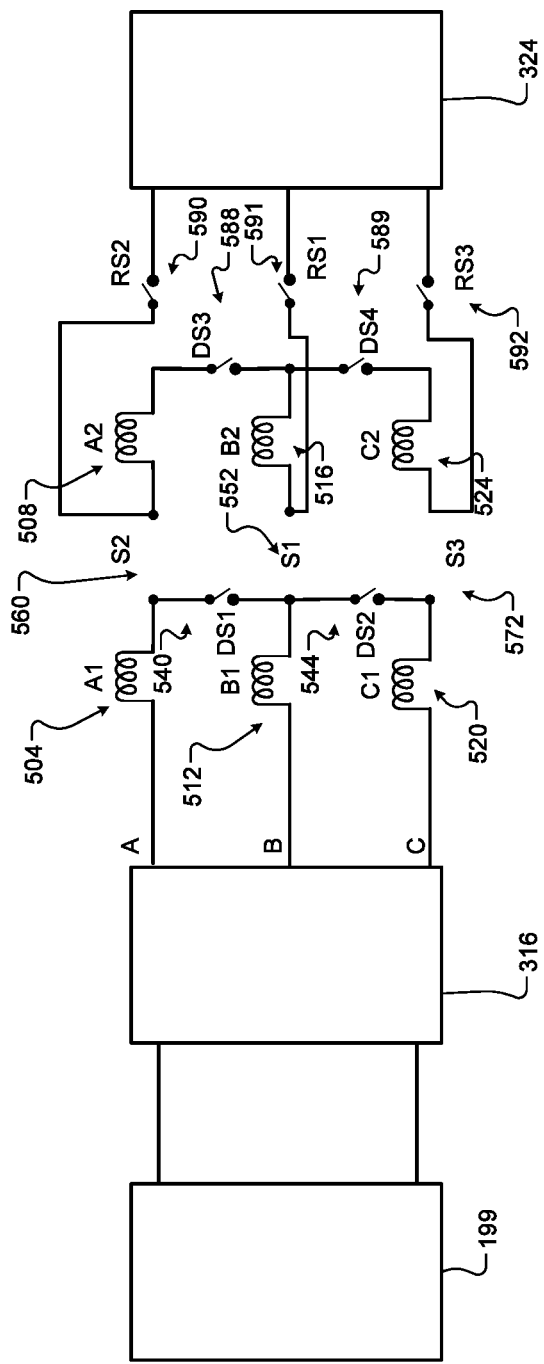

FIG. 6 includes an example illustration of the galvanic isolation that can be provided by the motor 198. In the example of FIG. 6, the motor control module 196 has opened the switches 552, 560, and 572 (S1, S2, and S3). Because the switches 552, 560, and 572 are open, the switches 552, 560, and 572 are not shown in FIG. 6 to help more clearly illustrate the isolation. In the example of FIG. 6, the stator windings are used as transformers. For example, the second, fourth, and sixth stator windings 508, 516, and 524 act as primary windings, and the first, third, and fifth stator windings 504, 512, and 520 serve as secondary windings, respectively. In this way, the motor 198 can operate in place of an on board charge module (OBCM) with galvanic isolation. The OBCM can therefore be omitted. This reduces cost. While the stator windings are being used as transformers, the inverter module 316 functions as a synchronous rectifier with PWM (pulse width modulation) control and converts AC power to DC power and controls the application of power to the battery 199.

As shown in FIG. 3, the vehicle includes a charge port 324 through which the vehicle can receive or transmit power. For example, a power source 328 can be connected to the charge port 324 via a charge cable to charge the battery 199. The power source 328 can be an AC power source (e.g., single phase or three phase) or a DC power source.

The phases/legs of the inverter module 316 and the stator windings work together as a boost converter to boost from, for example, a lower voltage output of the charger 328 to a greater voltage to charge the battery 199. The stator winding inductances and the respective phase low side switches of the inverter module 316 (e.g., 420, 444, 460) may be controlled to act as an interleaved 2 phase boost converter. The motor control module 196 may control pulse width modulation (PWM) frequency, duty cycle, and phase shift between the two phase legs (e.g., B and C) based on power of the charger 328 and a position of the rotor of the motor 198.

As shown in FIG. 7, the AC power source 593 may be a single phase AC power source. In this example, the AC power source 593 is connected to the first and second stator windings (including 504, 508, 512, and 516). The motor control module 196 opens the switches 544 and 589. The motor control module 196 closes the switches 590, 588, 591, opens the switches 584 and 586, and closes the switch 540. The stator windings 504 and 512 then act as the secondary windings of transformers, and the stator windings 508 and 516 act as the primary windings of the transformers, respectively. Switches that are open may be illustrated as not present for purposes of illustration only.

While the example of the AC power source 593 is connected to the first and second stator windings (including 504, 508, 512, and 516) is shown, the AC power source 593 can instead be connected to the first and third stator windings (including 504, 508, 520, and 524) or to the second and third stator windings (including 512, 516, 520, and 524).

Figure 8:
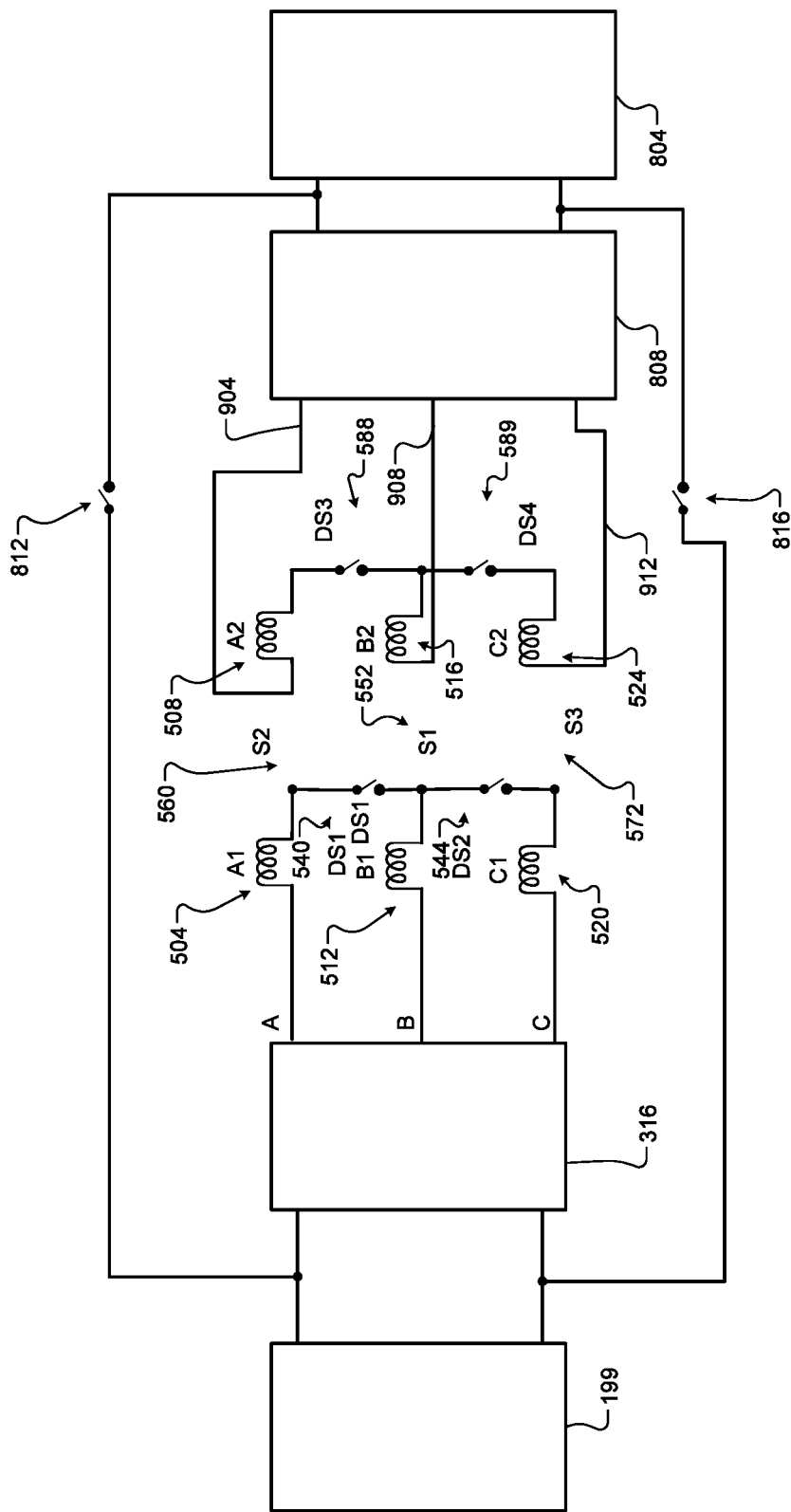

FIG. 8 is a functional block diagram illustrating an example where the power source 328 includes a DC power source 804. The switches 552, 560, and 572 are again shown open. An inverter module 808 is included and converts DC power from the DC power source 804 into 3 phase AC power. The inverter module 808 outputs 3 phase AC power to the motor 198. The inverter module 808 may be part of the motor 198 or may be implemented with the DC power source 804 (e.g., in a charger) or with the inverter module 316. The motor control module 196 or a switch control module of the charger may control switching of the inverter module 808. The inverter module 808 may be similar or identical to the inverter module 316, which functions as a rectifier during charging the battery 199.

Figure 9:
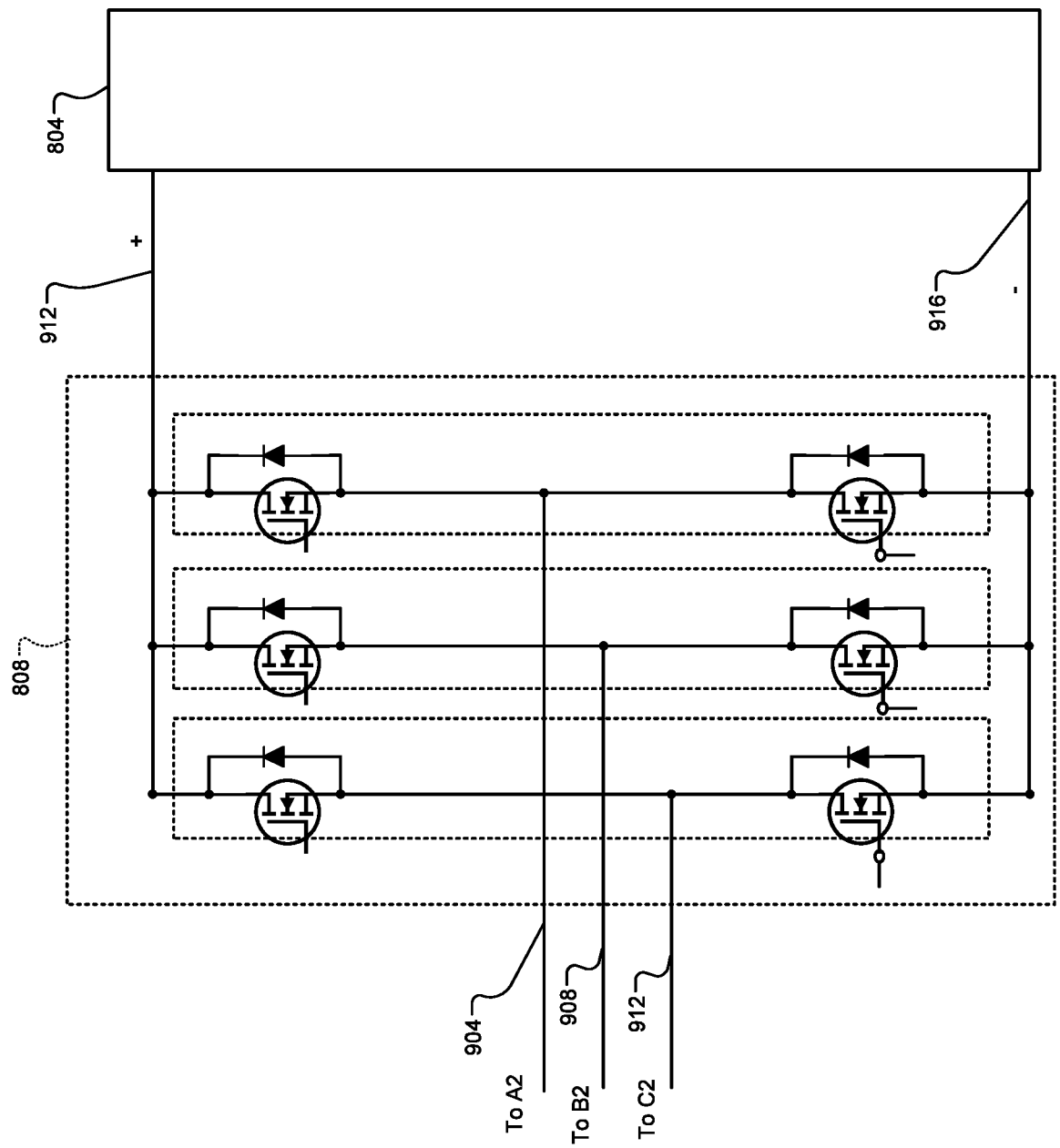
FIG. 9 includes a schematic of an example inverter and a direct current (DC) power source.

FIG. 9 includes a schematic of an example implementation of the inverter module 808. Outputs 904, 908, and 912 of the inverter module 808 are connected to the motor 198, such as to nodes 564, 556, and 576, respectively. Outputs 912 and 916 of the DC power source 804 are connected to upper and lower ends of the legs of the inverter module 808.

The inverter module 808 and stator windings of the motor 198 may be used to charge the battery 199 when the output voltage of the DC power source 804 is less than the voltage of the battery 199. The stator windings of the motor 198 can be used as discussed above to boost the output voltage of the DC power source 804 and charge the battery 199. Switches 812 and 816 can be opened by the switch control module for the charging of the battery 199. The motor control module 196 may open the switches 552, 560, and 572 to provide galvanic isolation.

If the output voltage of the DC power source 804 is greater than or equal to the voltage rating of the battery 199, the DC power source 804 can be used to directly charge the battery 199 via the switch control module closing the switches 812 and 816. In this example, the motor control module 196 may open the switches of the motor 198 and the inverter modules 316 and 808, and the DC power source 804 may directly charge the battery 199.

Figure 10:
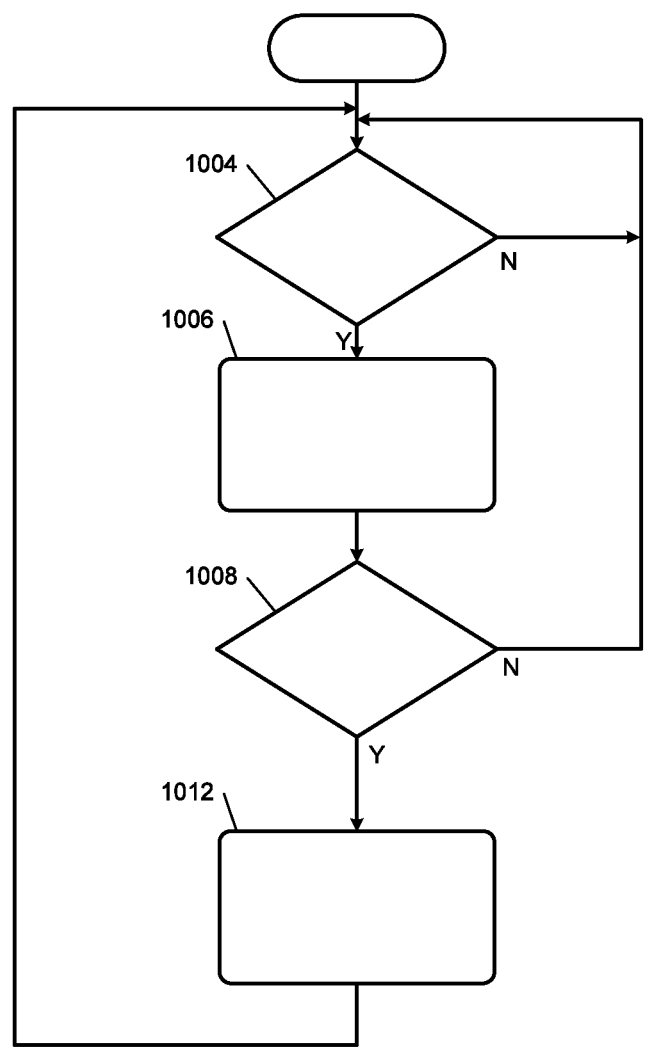
FIG. 10 includes a flowchart depicting an example method of charging a battery via a motor.

FIG. 10 is a flowchart depicting an example method of using a charger (e.g., 593 or 804) to charge the battery 199. Control may begin when the vehicle is parked. At 1004, the motor control module 196 determines whether the charger is connected to the charge port 324. If 1004 is true, control continues with 1008. If 1004 is false, control may return to 1004. The motor control module 196 may also determine whether the voltage rating of the charger is less than the voltage rating of the battery 199.

At 1008, if the voltage rating of the charger is less than the voltage rating of the battery 199, the motor control module 196 determines whether to charge the battery 199 or not. The motor control module 196 may determine to charge the battery 199, for example, when a state of charge of the battery 199 is less than a predetermined state of charge (e.g., 90 percent or another suitable value). The motor control module 196 may determine to not charge the battery 199 when the state of charge is greater than the predetermined state of charge. The motor control module 196 may determine the state of charge of the battery 199, for example, based on one or more voltages of the battery 199, one or more currents to and/or from the battery 199, and/or one or more other parameters. If 1008 is true, at 1012 the motor control module 196 controls switching of the switches of the motor 198 and the switches of the inverter module 316 to boost the output voltage of the power source 328 and charge the battery 199, such as discussed above. One or more other switches, such as 590, 591, and 592 may also be closed. The motor control module 196 may also open the switches 552, 560, and 572 for galvanic isolation. If 1008 is false, the motor control module 196 maintains the switches of the motor 198 and the inverter module 316 open as to not charge the battery 199 at 1012. Control returns to 1004.

The clutch 200 is shown in the example of FIG. 1 and can be used to mechanically couple the electrical machine 198 with wheels of the vehicle for torque transfer therebetween. The clutch 200 can also be used to mechanically de-couple the electrical machine 198 from the wheels. The motor control module 196 may actuate the clutch 200 and decouple the electrical machine 198 from the wheels before and throughout the charging (AC or DC) discussed herein. While the example of the clutch 200 is provide, the present application is also applicable to other types of mechanical shaft disconnect devices, such as absorbers (e.g., a pendulum type absorber or a dynamic damper) and other types of shaft disconnect devices.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   an inverter module including first, second, and third phases;
   a battery that has a first voltage and that is electrically connected in series with the inverter module;
   an electric machine including:
      a first stator winding including first and second stator winding portions, the first phase electrically connected to a first end of the first stator winding portion;
      a second stator winding including third and fourth stator winding portions, the second phase electrically connected to a first end of the third stator winding portion;
      a third stator winding including fifth and sixth stator winding portions, the third phase electrically connected to a first end of the fifth stator winding portion;
      a first switch electrically connected between (a) a second end of the first stator winding portion and (b) a first node that is electrically connected to a first end of the second stator winding portion;
      a second switch electrically connected between (a) a second end of the third stator winding portion and (b) a second node that is electrically connected to a first end of the fourth stator winding portion; and
      a third switch electrically connected between (a) a second end of the fifth stator winding portion and (b) a third node that is electrically connected to a first end of the sixth stator winding portion;
   a charge port electrically connected to the first, second, and third nodes and configured to be connected to an alternating current (AC) power source having a second voltage that is less than the first voltage; and
   a motor control module configured to selectively actuate switches of the inverter module, open the first, second, and third switches of the electric machine, and selectively actuate other switches of the electric machine and thereby charge the battery with power from the AC power source using the first, second, and third stator windings of the electric machine.

2. The system of claim 1 wherein the first, third, and fifth stator winding portions are galvanically isolated from the second, fourth, and sixth stator winding portions, respectively, when the first, second, and third switches of the electric machine are open.

3. The system of claim 1 wherein the first voltage is greater than 400 volts direct current (DC).

4. The system of claim 1 wherein the electric machine further includes:
   a fourth switch electrically connected between second end of the first stator winding portion and the secnd end of the third stator winding portion;
   a fifth switch electrically connected between the second end of the third stator winding portion and a second end of the fifth stator winding portion;
   a sixth switch electrically connected between the second end of the second stator winding portion and the second end of the fourth stator winding portion; and
   a seventh switch electrically connected between the second end of the fourth stator winding portion and a second end of the sixth stator winding portion.

5. The system of claim 4 wherein the motor control module is configured to, when a speed of the electric machine is greater than zero and less than a predetermined speed:
   selectively open the first, second, and third switches;
   maintain the sixth and seventh switches open; and
   selectively close the fourth and fifth switches.

6. The system of claim 5 wherein the motor control module is further configured to, when the speed of the electric machine is greater than the predetermined speed:
   selectively close the first, second, and third switches;
   maintain the sixth and seventh switches open; and
   selectively close the fourth and fifth switches.

7. The system of claim 4 wherein the electric machine further includes:
   an eighth switch electrically connected between the first end of the second stator winding portion and the first end of the fourth stator winding portion; and
   a nineth switch electrically connected between the first end of the fourth stator winding portion and the first end of the sixth stator winding portion.

8. The system of claim 4 wherein the fourth, fifth, sixth, and seventh switches each include a bidirectional switch.

9. The system of claim 4 wherein:
   the AC power source is a single phase AC power source; and
   the motor control module is configured to selectively open either:
      the fourth and sixth switches; and
      the fifth and seventh switches.

10. The system of claim 1 wherein the first, second, and third switches each include one of a relay and a solid state switch.

11. The system of claim 1 wherein the AC power source is a three phase AC power source.

12. An electric machine comprising:
   a first stator winding including first and second stator winding portions, a first end of the first stator winding portion configured to be electrically connected to a first phase of an inverter module;
   a second stator winding including third and fourth stator winding portions, a first end of the third stator winding portion configured to be electrically connected to a second phase of the inverter module;
   a third stator winding including fifth and sixth stator winding portions, a first end of the fifth stator winding portion configured to be electrically connected to a third phase of the inverter module;
   a first switch electrically connected between (a) a second end of the first stator winding portion and (b) a first node that is electrically connected to a first end of the second stator winding portion, the first node configured to be connected to a first output of a power source;
   a second switch electrically connected between (a) a second end of the third stator winding portion and (b) a second node that is electrically connected to a first end of the fourth stator winding portion, the second node configured to be connected to a second output of the power source; and
   a third switch electrically connected between (a) a second end of the fifth stator winding portion and (b) a third node that is electrically connected to a first end of the sixth stator winding portion, the third node configured to be connected to a third output of the power source.

13. A system comprising:
a first inverter module including first, second, and third phases;
a battery that is electrically connected in series with the first inverter module;
an electric machine including:
- a first stator winding including first and second stator winding portions, the first phase electrically connected to a first end of the first stator winding portion;
- a second stator winding including third and fourth stator winding portions, the second phase electrically connected to a first end of the third stator winding portion;
- a third stator winding including fifth and sixth stator winding portions, the third phase electrically connected to a first end of the fifth stator winding portion;
- a first switch electrically connected between (a) a second end of the first stator winding portion and (b) a first node that is electrically connected to a first end of the second stator winding portion;
- a second switch electrically connected between (a) a second end of the third stator winding portion and (b) a second node that is electrically connected to a first end of the fourth stator winding portion; and
- a third switch electrically connected between (a) a second end of the fifth stator winding portion and (b) a third node that is electrically connected to a first end of the sixth stator winding portion;

a charge port electrically connected to the first, second, and third nodes and configured to be connected to first, second, and third phases of a second inverter module that receives a direct current (DC) output from a DC power source; and
a motor control module configured to selectively actuate switches of the first inverter module, open the first, second, and third switches of the electric machine, and selectively actuate other switches of the electric machine and thereby charge the battery with power from the DC power source using the first, second, and third stator windings of the electric machine.

14. The system of claim 13 wherein:
the battery has a first voltage; and
the DC power source has a second voltage that is less than the first voltage.

15. The system of claim 13 further comprising:
a fourth switch configured to be connected to a first reference potential of the DC power source and connected to a first reference potential of the battery; and
a fourth switch configured to be connected to a second reference potential of the DC power source and to a second reference potential of the battery.

16. The system of claim 15 wherein:
the battery has a first voltage; and
the DC power source has a second voltage that is greater than or equal to the first voltage.

17. The system of claim 13 wherein the first, third, and fifth stator winding portions are galvanically isolated from the second, fourth, and sixth stator winding portions, respectively, when the first, second, and third switches of the electric machine are open.

18. The system of claim 13 wherein a first voltage of the battery is greater than 400 volts direct current (DC).

19. The system of claim 13 wherein the electric machine further includes:
a fourth switch electrically connected between second end of the first stator winding portion and the second end of the third stator winding portion;
a fifth switch electrically connected between the second end of the third stator winding portion and a second end of the fifth stator winding portion;
a sixth switch electrically connected between the second end of the second stator winding portion and the second end of the fourth stator winding portions; and
a seventh switch electrically connected between the second end of the fourth stator winding portion and a second end of the sixth stator winding portion.

20. The system of claim 19 wherein the fourth, fifth, sixth, and seventh switches each include a bidirectional switch.